Figure 1:
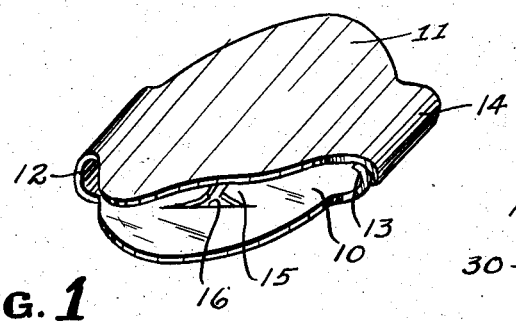

Jan. 9, 1945.  G. A. TINNERMAN  2,366,942
FASTENING DEVICE
Filed July 19, 1943

INVENTOR.
GEORGE A. TINNERMAN
BY Bates, Teare, & McDean
ATTORNEYS

Patented Jan. 9, 1945

2,366,942

UNITED STATES PATENT OFFICE 2,366,942

FASTENING DEVICE

George A. Tinnerman, Cleveland, Ohio, assignor to Tinnerman Products, Inc., Cleveland, Ohio, a corporation of Ohio Application July 19, 1943, Serial No. 495,278

7 Claims. (Cl. 85—36)

This invention relates to fastening means comprising a projecting stud and a head adapted to be applied to the stud by movement in an axial direction, the head automatically locking itself to the stud so as to bear against a member from which the stud projects and hold it in place. The invention is particularly concerned with the head, which is a member made of a single piece of resilient sheet material doubled on itself and provided with an opening in its bottom portion about which the material is deformed to provide inclined struts adapted to engage the stud and lock the head thereto.

The top member of the folded head is spaced from the bottom member to allow ample room for the projecting portion of the stud. These top and bottom portions of the head, at the edge opposite the return bend connecting them, are interlocked with each other so that the head, though made of resilient sheet material, presents a firm button-like device which may be readily pressed manually into place on the stud and by extending across the point of the stud will entirely cover such point and prevent accidental contact therewith.

My invention has a variety of uses for fastening various members in place, among which may be mentioned sheets of insulation. In such usage a series of studs may be fastened by welding or otherwise to a supporting metal plate, for instance, and then the sheets of insulation put in position with the studs extending through the sheets, and thereafter the button heads applied manually to the portion of the studs which projects beyond the insulation. For this usage, the fastening head preferably has a considerable area to cover a sufficient portion of the insulation to hold it firmly without injury to its comparatively soft structure.

My invention is illustrated in the drawing hereof, and hereinafter more fully described, and the essential novel features summarized in the claims.

Figure 4:
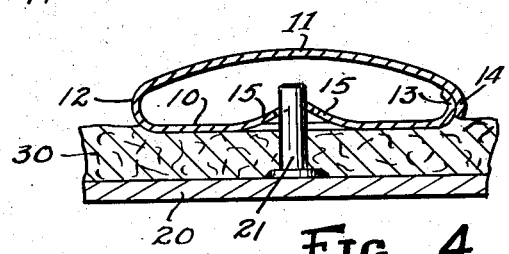
Figure 2:
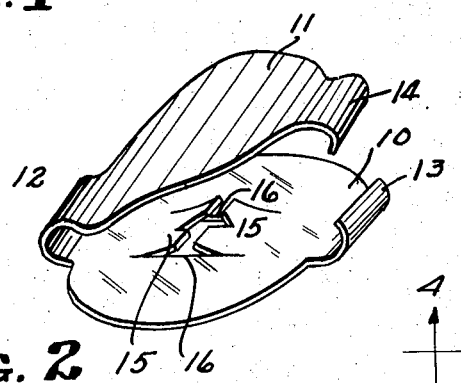
Figure 3:
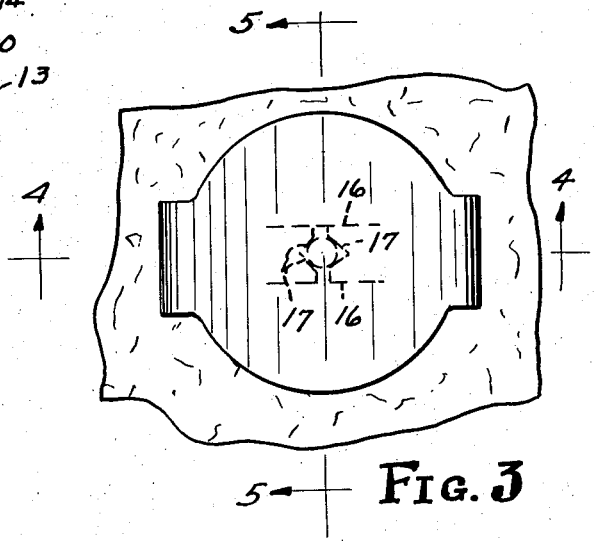
Figure 5:
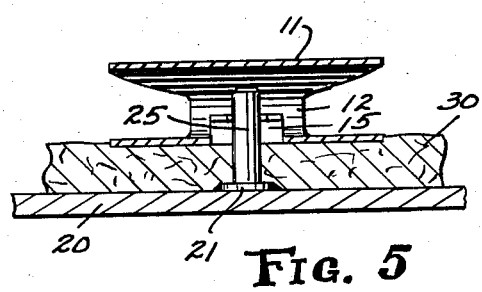
Figure 6:
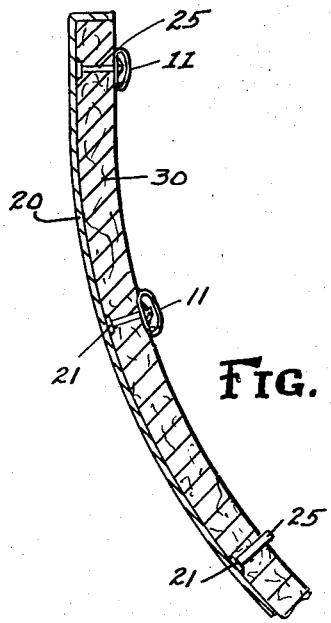

In the drawing, Fig. 1 is a perspective of the fastening device ready for application; Fig. 2 is a perspective of the fastening device as formed before the free edges have been interlocked with each other; Fig. 3 is a plan or face view of the fastening device in place against a sheet of insulating material; Fig. 4 is a cross section of the fastener and parts secured by it in a plane extending through the return bend and the interlocked edges, as indicated by the line 4—4 on Fig. 3; Fig. 5 is a cross section of the applied fastener in a plane at right angles to Fig. 4, as indicated by the line 5—5 in Fig. 3; Fig. 6 is a sectional view illustrating the use of these fastening devices applied to several studs projecting through a sheet of insulation lying against a curved metal plate which may, for instance, be a part of the hull of a boat.

The fastening device, as shown in each of the figures, is a single piece of sheet material, preferably spring steel, and comprises a bottom portion 10, preferably of disc-like form; a top portion 11 preferably of the same extent and contour; a return bend 12 of comparatively short extent connecting the top and bottom portions, and interlocking lips 13 and 14 at the edges of the top and bottom portion opposite the return bend. The bottom lip 13 is preferably curved upwardly and inwardly and the top lip 14 curved downwardly and inwardly so that it may readily snap over and interlock with the bottom lip when the top of the device is pressed into approximate parallelism with the bottom, such interlocked condition being shown in Figs. 1, 4 and 6.

The bottom plate of the fastener has an opening for the passage of the stud and the material about the opening is deformed to make struts to engage the stud. Two struts 15 are shown, directly opposite each other and partially severed from the bottom plate and inclined upwardly on opposite sides of the opening for the stud, so that these ends may readily slide along the stud but will bite into it when the fastener is shoved into place.

In forming the struts I make two parallel slits 16 in the base member of the fastener and cut out a central portion between them, which has V-shaped extensions 17 on its opposite sides. This leaves the two tongues 15 anchored to the bottom plate at their far ends and when these tongues are bent diagonally upwardly they present the two struts shown in Fig. 2, which have opposed V-shaped notches in their ends, to engage the stud effectively.

In Figs. 4, 5 and 6, I have indicated a plate 20 which carries the studs 25 projecting through a sheet 30 of insulating material. If the plates 20 are of metal the studs are preferably in the form of short blunt nails having heads 21 abutting the inner face of the plate 20 and secured thereto as by welding. Such method enables all of the studs to be secured in position on the metal plate and a sheet of insulation thereafter put into place by pressure toward the plate causing the studs to project through the insulation and a short distance beyond the inner face thereof. Then my fastening devices are applied by manual pressure to the projecting end portion of the studs, and when in place lock themselves automatically to the studs and extend over a sufficient area of the sheet of insulation to bind it firmly in place without injury to it, as illustrated in various figures.

It will be seen particularly from the cross sections of Figs. 4 and 5, that the bottom member of the fastener shown is flat to engage effectively a substantially flat surface to be clamped, while the top member is curved on a substantially cylindric arc, the curvature extending from the return bend or hinge 12 to the locking lip 14, the surface being thus composed of straight lines extending at right angles to the curve. This formation gives sufficient extensibility to the top member to enable the lip 14 to be readily sprung over the lip 13 by pressure of the top member toward the bottom member. The curvature also provides considerable space in the central region between the top and bottom members, as indicated in Fig. 4, so that identical fasteners may be employed with studs which project varying amounts.

My fastening devices may be cheaply constructed, are of light weight and yet strong, and may be quickly applied by manual pressure to the projecting studs. When positioned, these devices hold themselves firmly in place, to retain the sheet of material without injury to it, and they form a protection over the projecting ends of the studs, so that there is no danger of attendants catching their clothing on such projecting ends or injuring their hands by accidental contact.

It should be noted that the peculiar design of this fastener enables manufacture of the device on fully automatic production equipment, whereas other types of capped fastening devices require additional manually controlled operations to accomplish the capping or protective cover. The invention reduces the cost of manufacture, minimizes handling and facilitates the hardening operation whenever the fasteners are of material where hardening is feasible or desirable.

I claim:

1. A fastening device made of a single piece of material bent on itself to provide a top member and bottom member, said members having integral means interlocking with each other at the edge opposite the connecting bend, the bottom member having an opening and deformed material adjacent the opening to engage a stud passing through the opening, the point of such stud being covered by the top member.

2. A fastening device made of a single piece of resilient sheet material and comprising top and bottom members spaced apart and connected by a return bend, the bottom member having an opening with the material deformed adjacent the opening to engage a stud passing through the bottom member and there being snap acting means for interlocking the top and bottom members to each other.

3. A fastening device made of a single piece of sheet material comprising a bottom member having an opening with deformed material providing upwardly inclined stud engaging means at the edge of the opening and a top member connecting with the bottom member by an integral return bend, the top and bottom members having inwardly curved interlocking lips at the edges opposite the return bend.

4. A fastener made of a single piece of sheet metal comprising a bottom disc provided with an opening and a pair of tongues partially severed from the bottom disc and bent diagonally upward in the position to engage a stud passing through the opening, a top member also of disc formation and curved in a cylindrical arc, the two members being connected by an integral return bend extending for a comparatively short distance substantially tangential to the edges, the two members being connected in the region diametrically opposite the return bend by an upwardly and inwardly curved lip on the bottom member and a downwardly and inwardly curved lip on the top member, which two lips nest with each other and extend in a substantially tangential direction.

5. A fastening device comprising a bottom member, a top member, a comparatively short return bend portion connecting the top and bottom members and acting as a hinge, an upwardly curved lip on the bottom member in the region opposite the hinge and a downwardly curved lip on the top member in the region opposite the hinge, said lips adapted to interlock with each other when the top member is pressed toward the bottom member, the bottom member having an opening and provided with means carried thereby to engage a stud passing into the space between the members, and the top member being impervious over said opening and standing a material distance above the same to provide a protection over the point of a stud passing through said opening.

6. A fastening device made of a single piece of resilient sheet material and comprising a disc-like bottom portion, an impervious disc-like top portion, a tangential return bend of comparatively short extent connecting the top and bottom portions and tangential interlocking lips at the edges of the top and bottom portion opposite the return bend, the bottom portion having an opening for the passage of a stud and being deformed upwardly about the opening to engage the stud bindingly.

7. A fastening device comprising a disc-like flat bottom portion, a disc-like convex top portion, a return bend of comparatively short extent integral with the top and bottom portions and connecting them, and interlocking lips at the edges of the top and bottom portion opposite the return bend, the bottom portion having an opening for the passage of a stud and stud-engaging means carried by the bottom portion, and the top member being impervious over said opening and standing a material distance above the same to provide a protection over the point of a stud passing through said opening.

GEORGE A. TINNERMAN.